Figure 1:
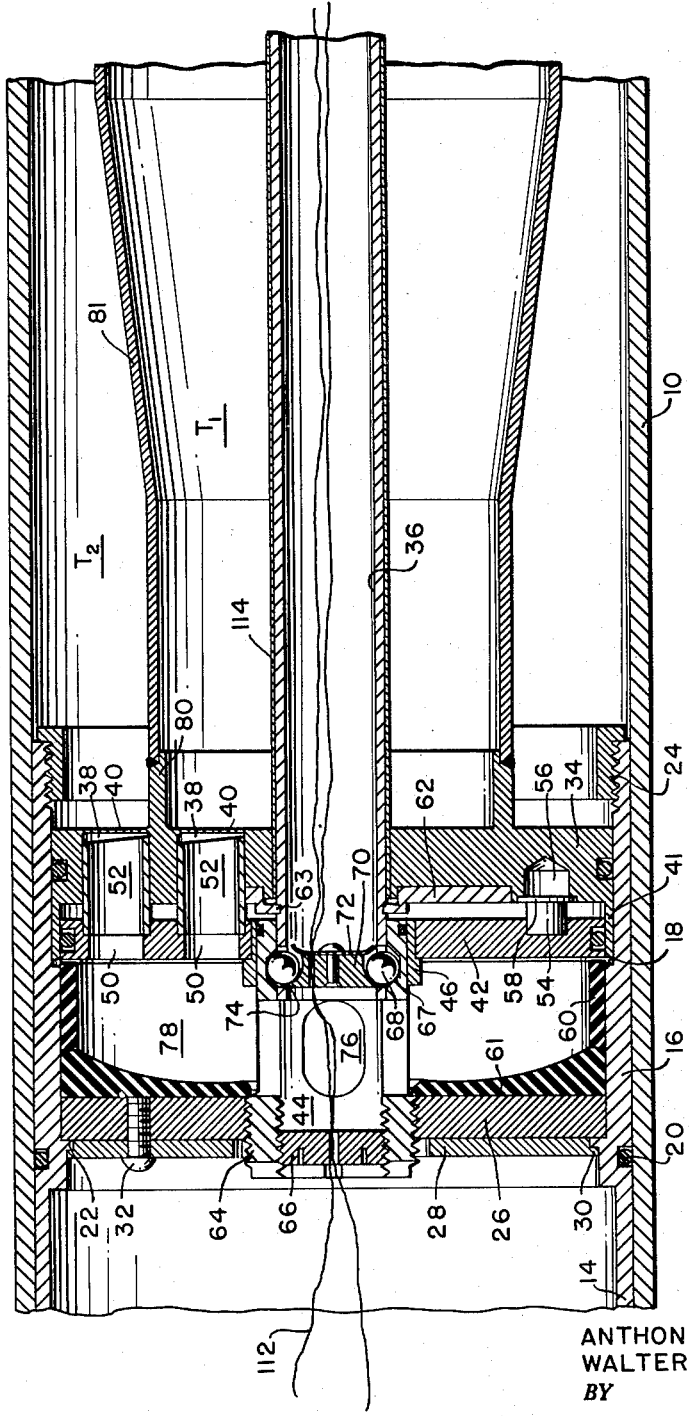

July 18, 1961

A. R. OZANICH ET AL 2,992,528

LIQUID PROPELLANT GAS GENERATOR FOR LIQUID
PROPELLANT TYPE ROCKETS

Filed March 28, 1955

4 Sheets-Sheet 1

INVENTORS
ANTHONY R. OZANICH
WALTER M. CANNIZZO
BY

ATTORNEYS

INVENTORS
ANTHONY R. OZANICH
WALTER M. CANNIZZO
BY
ATTORNEYS

United States Patent Office 2,992,528
Patented July 18, 1961

2,992,528
LIQUID PROPELLANT GAS GENERATOR FOR LIQUID PROPELLANT TYPE ROCKETS
Anthony R. Ozanich and Walter M. Cannizzo, China Lake, Calif.
Filed Mar. 28, 1955, Ser. No. 497,479
1 Claim. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The present invention relates to fluid fuel rockets and particularly to improved methods and means for pressurizing the liquid propellant tanks of liquid fuel propulsion systems. More particularly, the present invention relates to a method and system for pressurizing the liquid tanks by the generation of gas from the propellant liquids themselves.

In liquid fuel rocket propulsion systems, two liquid propellant materials are usually employed, one being the fuel proper and the other being the oxidizer for supplying the oxygen necessary for combustion of the fuel. The two propellant liquids are stored in separate tanks or containers within the rocket casing, and upon firing actuation of the system, the two liquids are, by various means, released to flow separately into a combustion chamber. Upon intermixing of the liquids in the combustion chamber, the liquids are ignited with the resultant generation of gases which are discharged through a nozzle assembly to propel the rocket.

In systems of the type described the two tank means for storing the liquid propellant components are generally sealed by diaphragms or the like. It has been customary to provide a source of gas under pressure to cause such relative movement of parts as necessary to rupture said diaphragms and initiate the flow of the liquid propellant components to the combustion chamber. A further and primary function of such gas pressure providing means has been the pressurization of the propellant components to compel and control the flow to the combustion chamber.

In the past, it has been customary to employ either stored high pressure gas or a solid propellant gas generator for pressurizing the liquid tanks of rocket propellant systems.

Stored high pressure gas systems for pressurizing rocket propellant tanks are disadvantageous for several reasons. In the first place, such systems involve the addition of substantial weight to the rocket assembly, with the attendant loss of performance. Also, stored high pressure gas systems are subject to variations in performance in response to temperature differences and therefore may require mechanical regulation means. Such systems are therefore heavy, costly, and may involve physical risks upon failure of regulatory devices under varying temperature conditions.

Solid propellant gas generating systems for pressurizing rocket propellant tanks have been in common use. They have several diadvantages, however, in that they are more vulnerable to gunfire and shrapnel than other types, and in that certain dangers may result from rough handling. Rough handling can crack solid propellant grains and cause a premature explosion or "blow-up" of the rocket should it be fired with a cracked grain.

The present invention, in the provision of a liquid propellant gas generating pressurizing method and system, overcomes the disadvantages inherent in the prior known systems used for performing the pressurizing function. A liquid propellant gas generating system makes it unnecessary to add separate tanks and regulatory means as in the prior stored high pressure gas systems. It is less vulnerable to gunfire and shrapnel or liable to be rendered dangerous by rough handling than the solid propellant gas generating type. Moreover, it is lighter, less costly to manufacture, and more easily regulated than either of the types mentioned. Regulation of the gas-generator herein disclosed is easily accomplished for a broad range of gas generator rates by simply changing the size of the orifices of the generator injector whereas mechanical regulating means are necessary in the stored high pressure gas type system and only limited adjustment of the solid propellant type is possible without scrapping parts or redesigning the granular construction of the solid propellant.

It is perhaps best pointed out here that it is possible to depend upon acceleration of the rocket, alone, to apply forces to the bodies of liquids in the propellant tanks, which forces tend to give pressure feed of the liquids. However, since such forces are directly proportional to the masses involved, the rate of feed has a tendency to diminish progressively as the heights of the columns of liquids decrease.

In accordance with the foregoing, it is an object of the present invention to provide improved methods and means for pressurizing the propellant tanks of liquid fuel rocket propulsion systems which are free of the disadvantages in weight, lack of simplicity and performance limitations of the known prior art as pointed out herein.

Another and more specific object is the provision of a method and means for generating gases from liquid propellant materials for pressurizing the propellant tanks of liquid fuel rocket propulsion systems.

A further object of the invention is to provide a method and means utilizing gas pressure for the feeding of liquid propellant components to the combustion chamber of liquid fuel rocket propulsion systems in which a portion of the liquid propellant components themselves are utilized to be separately burned to form the pressurizing gases.

It is another object of this invention to provide, in a liquid propellant fuel burning system a method and means to utilize a portion of the liquid propellants to generate gases, in a separate combustion chamber, which are jetted into the main combustion chamber to assist propellant mixing therein.

It is a still further object of this invention to provide a method and means for utilizing liquid fuels to generate gas to pressurize the liquid propellant tanks of rocket propulsion systems in which the liquid fuels are combined in a fuel-rich ratio so that a substantial amount of gas generation takes place in the main tanks to augment the pressurizing effect.

Figure 2:
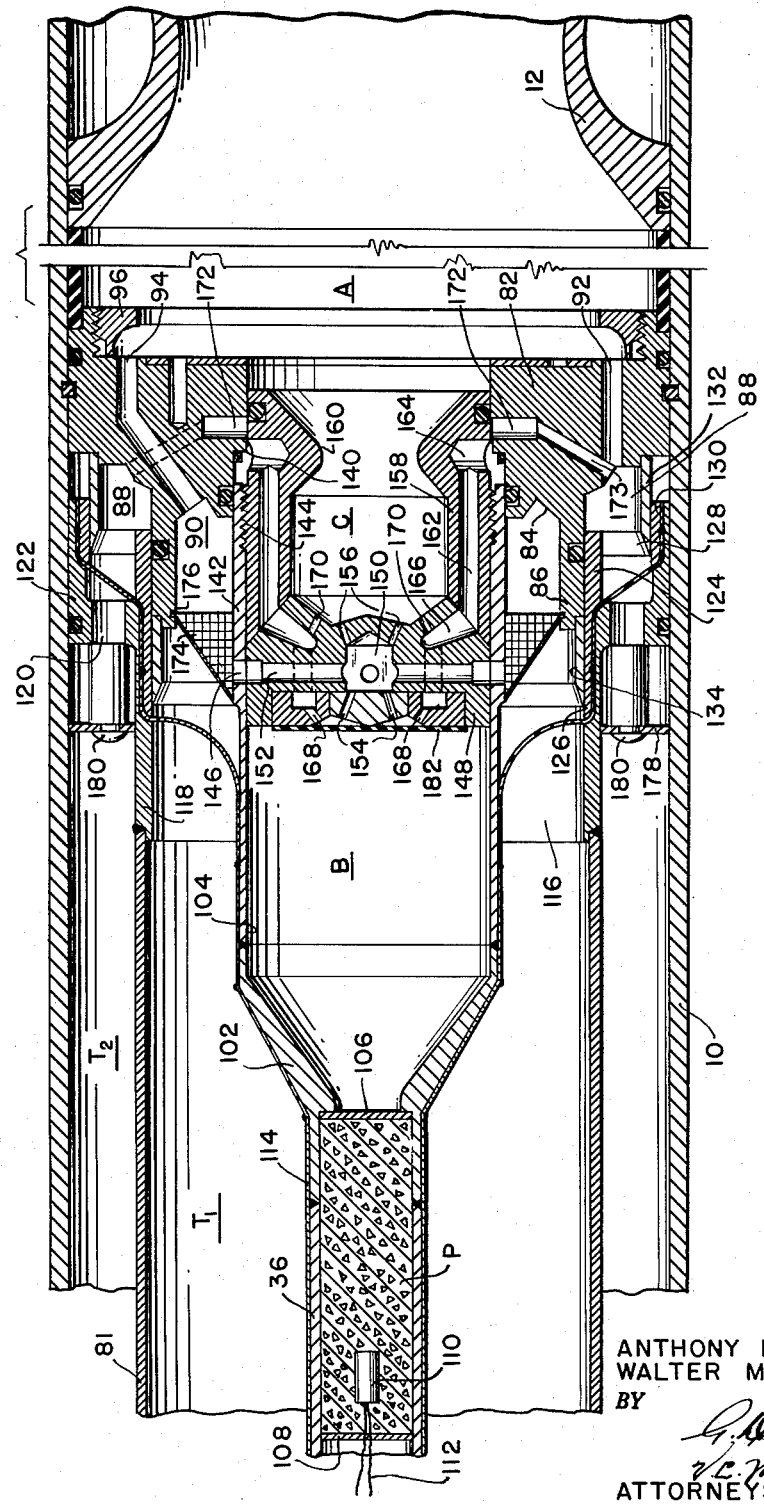

Other objects and many of the attendant advantages of the present invention will become apparent as the same become better understood from the following detailed description, taken in conjunction with the accompanying drawings, in which:

FIGS. 1 and 2 represent a composite longitudinal sectional view of a rocket body embodying the improved pressure propellant feeding system of the present invention, the parts being shown as they appear prior to firing actuation; and the central and end portions being deleted so that a clearer showing of the novel portions could be made, FIG. 1 representing the forward end and FIG. 2 the rear end of the motor section.

Figure 3:
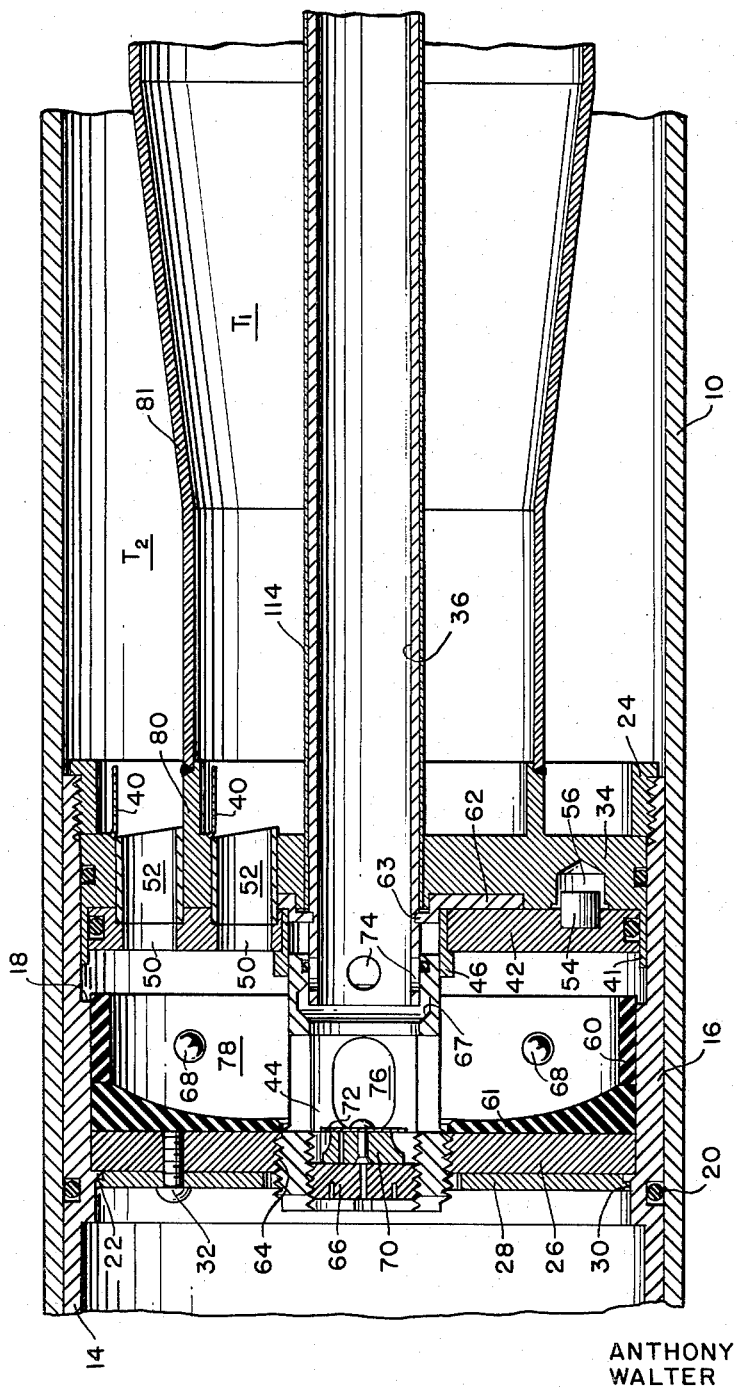
Figure 4:
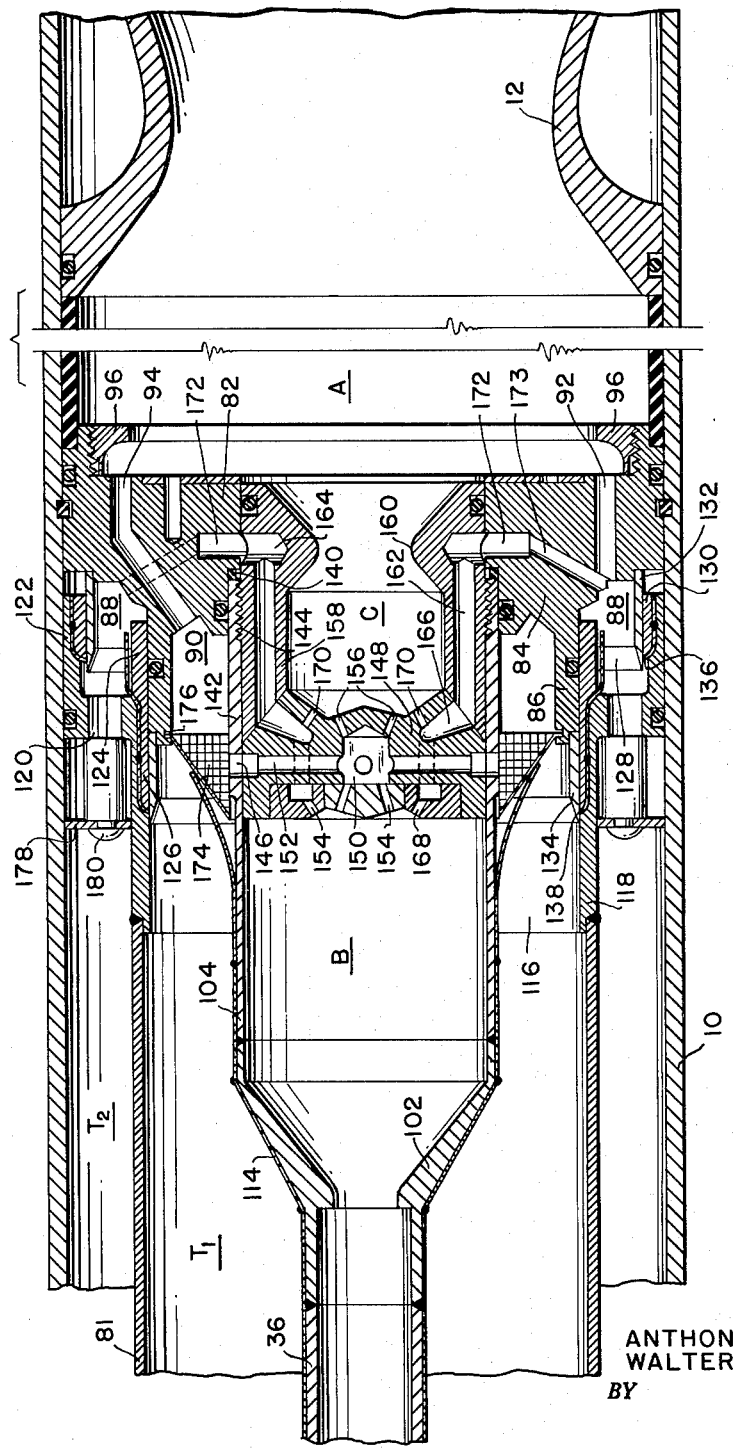

FIGS. 3 and 4 are views similar to FIGS. 1 and 2, respectively, showing the parts in the position they assume after firing.

The forward end of the rocket has not been illustrated, nor have the stabilizing fins. Similarly, other elements involving means to fill the tanks, specific electrical terminal means, etc. which are old in the art and do not relate to the improvements disclosed in this invention have not been shown. It is to be understood, of course, that rockets embodying the present invention may include such means where desired. The omissions serve to allow a simplified larger scale showing of the invention herein disclosed and have no bearing on the invention itself.

Referring now to the drawings, the two sets of figures illustrate the same structure in two different positions and like reference numerals, are applied to like parts in all figures. The rocket comprises an outer cylindrical shell or casing 10 terminating at its forward end in the usual nose section (not shown) and provided at its rear end with the usual stabilizing fins (not shown) and nozzle structure 12. At a point aft of the nose section and at what might be called the forward end of the motor section of the rocket, there is fixedly attached to the casing 10 a cylindrical internal housing and supporting ring 14, of external diameter equal to the internal diameter of casing 10 and in continuous peripheral contact therewith. Supporting ring 14 is relatively shorter than casing 10, and at a portion intermediate its ends the wall thereof is thickened as at 16 to provide a ledge 18. Thickened wall portion 16 is formed with an appropriate circumferential notch for retention of a sealing ring 20 as shown, with an integral internally directed circumferential flange 22. Ring 14 is internally threaded at its rearward end for threaded engagement with a stop ring 24. An internally threaded annulus 26 having an outside diameter equal to the inside diameter of the thickened portion of the ring 14 is fixedly positioned within ring 14 by means of retainer plate 28. Retainer plate 28 is of flat construction as shown and provided with an outstanding peripheral flange 30 and with a plurality of openings to accommodate screws 32 which are threaded into appropriate threaded openings in the annulus 26 (only one such connection is shown in the drawings by virtue of the section taken, but there are a plurality thereof, spaced around the plate). Thus, plate 28 and annulus 26 are retained in a fixed position relative to flange 22. Within the supporting ring 14, forward of stop ring 24 is a primary piston and inner tank head element 34 adapted to have sliding movement in ring 14 and having sealing means as shown. Piston element 34 is of such outer proportions as to engage the rearward non-thickened section of supporting ring 14 and to be limited in its forward motion by the ledge 18 and in its rearward motion by stop ring 24. Piston element 34 has a central opening to accommodate the forward end of the gas tube 36 and is provided with a plurality of cavities 38 which extend entirely through the piston except for thin portions of metal 40 at the rear side of the piston which are rupturable by means and for reasons to be discussed hereinafter. Piston element 34 is also provided with a longitudinal skirt 41 at its outer periphery, extending forwardly, and serving as housing and guide for a secondary piston 42, the latter having sliding movement within the skirt 41. Secondary piston 42 has a central opening to accommodate the locking assembly housing 44 which surrounds the forward end of gas tube 36 and includes annular bearing 46 fixedly attached thereto to allow sliding relative movement of locking assembly housing 44, as shown, appropriate sealing ring means being provided. Secondary piston 42 is provided with through passages 50, each having a fixedly fastened knife blade 52 positioned therein, and the two pistons are so positioned that the knife blades are retained in cavities 38 so that they may be moved to rupture the thin metal portions 40 of piston 34. To prevent such rupture prematurely the secondary and primary pistons are provided with a cooperating spacing pin 54 and socket 56 respectively upon their respective opposed faces so that upon relative movement of the pistons the pin may move into the socket, such movement, however, being impeded by a rupturable disc 58 cemented to the face of the primary piston. The length of the pin 54 is such, relative to the distance between knives 52 and thin metallic walls 40 that the disc 58 must be ruptured before the knives can penetrate the walls 40. Movement of secondary piston 42 in the other (forward) direction is limited by the cylindrical piston stop ring and shield member 60 and annular shield element 61 which are bonded to the walls of support ring 14 and annulus 26 respectively. Gas tube 36 is fixed to primary piston 34 for movement therewith by stepped ring 62. Ring 62 as shown, is of annular configuration with cut-outs to accommodate knives 52 and with a forwardly extending stepped central portion of slightly smaller diameter than the inside diameter of secondary piston 42. This stepped portion extends internally into a circumferential notch in tube 36 as shown at 63. Ring 62 is fastened to the forward wall of the primary piston 34 by a plurality of screws (not shown), whereby tube 36 is effectively rigidly connected to piston 34 for movement therewith. Locking assembly housing 44 comprises a hollow cylindrical member which is externally screw threaded at its forward end for adjustable screw threaded engagement with the annulus 26, as shown at 64, and which is internally screw threaded to receive a cap member 66. Locking assembly housing 44 is of such internal diameter as to slidably house the forward end of gas tube 36, and is provided, just aft of the forward end of the tube, with an annular ball retaining groove 67, to cooperate with a similar groove in a locking member 70 and with a plurality of holes 74, in gas tube 36, in housing magnetic balls 68, as shown. Locking member 70 thus restrains tube 36, piston 34 and the connected tank wall 81 from movement in a rearward direction until it is itself moved to release balls 68. Locking member 70 is releasably restrained from forward motion by retaining spring disc 72 which is attached to closure 70 by a rivet or the like, as shown. The walls of the hollow cylindrical locking assembly housing 44 are provided with a plurality of openings 76 to allow passage of gases into chamber 78 from tube 36 when element 70 is in its forward position.

It is considered appropriate at this time to briefly describe the operation of the structure thus far described. Upon the development of a sufficient gas pressure in gas tube 36, the force against locking member 70 is sufficient to bend spring 72 around the magnetic balls and the locking member 70 is driven to the forward end of the locking assembly housing 44. The gas then enters chamber 78 through openings 76. Secondary piston 42 is thus placed under pressure and moves rearwardly, first breaking frangible disc 58 and then puncturing the thin metal walls 40 of the primary piston or tank head 34 and finally imparting movement to said primary piston for purposes to be more fully explained hereinafter.

Primary piston or tank head 34 is provided with a circular longitudinal wall 80, extending outwardly from the rearward side and of greater dimension than gas tube 36. A hollow tubular tank wall member 81, of appropriate size is welded, as shown, to the extended edge of wall 80. Tank member 81, closed at the opposite ends by means to be later described, forms, with outer casing 10, a plurality of liquid fuel component tanks, T–1 and T–2. The inner tank T–1 includes and surrounds gas tube 36 and the entire arrangement is such that when movement is imparted to tank head (primary piston) 34 the gas tube and the inner tank are movable, as a unit, in a rearward direction.

At the rear end of the motor section of the rocket is the main combustion chamber A in which the two liquid propellant components are burned to generate gases for propulsion of the rocket. These liquids are fed to combustion chamber A through a main injector 82. Injector 82 comprises an annular element of generally stepped configuration, the main body of which is of a diameter substantially equal to the inner diameter of outer casing 10, and which is fixedly attached to the outer casing at the forward edge of combustion chamber A, and provided with appropriate sealing and positioning means, as shown. Injector 82 is provided with a central opening to accommodate auxiliary combustion chambers B and C and the gas generating injector therefor for sliding movement as will be later described. Forward of the main cylindrical section of injector 82, is a generally conical thickened portion 84 which terminates in a longitudinally extending cylindrical wall 86 of an external diameter of approximately the inner diameter of inner tank T-1. It should be noted that wall 86 thus provides two annular liquid feed manifolds, from the two sources, namely the passage 88, capable of allowing passage of liquid from the outer tank T-2 to the injector ports, and passage 90, capable of directing liquid from inner tank T-1 to the injector ports. Injector 82 has an annular ring of spaced ports which open into the combustion chamber A from the after face of the injector body and which are the outlets of alternately arranged passages 92 and 94. Passages 92 pass directly longitudinally through injector body 82 to allow passage of liquid from the outer tank through manifold 88 to the combustion chamber. Passages 94, extending angularly inwardly as shown, allow passage of liquid from the inner tank through manifold 90 to the combustion chamber. The size and number of passages 92 and 94 are so selected, of course, as to give the fuel-oxygen mixture and rate of fuel desired. The after end of injector 82 is provided with an internally threaded skirt to which a baffle ring 96 is affixed to direct the streams of liquid centrally of the combustion chamber and to effect better admixture of the two liquids. Also, the after face of injector 82 which faces into combusion chamber A is provided with a heat resistant facing, secured thereto by screws, as shown, in order to prevent burning out of the injector ports.

Gas tube 36, as shown, is of cylindrical configuration throughout most of its length, flaring into a thickened conical wall 102 which opens into a gas generating combustion chamber B, formed by enlarged cylindrical wall 104. Thickened conical wall 102 is formed with ledge means to seat the retaining disk 106 to hold a charge of an initiator material P which may be a dry propellant or other gas producing combustible material and which is retained in position by a second disk 108. A detonating means 110 is embedded within the charge of initiator and lead wires 112 connected thereto pass through appropriate restricted openings in disk 108, spring 72, locking member 70, and cap member 66 to electrical connectors (not shown) and to a source of electrical energy for detonation (not shown). A web of thin aluminum or other metallic sheathing 114 is positioned externally of gas tube 36 throughout the length so far described being attached to the forward edge of the primary piston or tank head 34 and to the enlarged conical portion 102 and outer wall 104 of combustion chamber B, by suitable means, as by welding, etc. The after end of the sheath or web 114 is then brought outwardly to cooperate with end rings 116, 124 and 130 to complete and seal the tank structures. End ring 116 comprises a cylindrical forward section 118 of substantially the diameter of inner tank wall 81 and which is suitably connected to tank wall 81, as by welding, to form a fluid tight joint therewith. At the rear end of section 118 there is provided an inwardly directed radial circular portion 120 with a plurality of liquid passages therein, the outer circumference of which is slightly less than the inner circumference of outer casing 10 and to which is appended a rearwardly extending skirt or wall 122 for sliding engagement with outer casing 10. The rearwardly extending portions of walls 118 and 122 are thinned as shown for reception of mating portions of rings 124 and 130, respectively. Ring 124 comprises a cylindrical element having a thinned portion as at 126 of such outer diameter as to mate with the rearward thinned edge of the wall 118, and of such inner diameter as to accommodate wall 86 for sliding relative motion. End ring 130 comprises a thin cylindrical element of such external diameter as to mate with the thinned down portion of wall 122, as shown, and of such internal diameter as to accommodate the knife blade 132 for movement relative thereto, as shown. The respective diameters and positions of rings 124 and 130, as described, result in the formation of an annular passage 128 therebetween, connecting tank T-2 and manifold 88. The metallic sheath or web 114 is extended radially, adjacent the rearward end of combustion chamber (gas generator) B and passed between the mating annular walls 118 and 126 as shown, is further extended radially and is positioned between the mating walls 122 and 130 and the web and walls are sealingly connected as by welding, as shown, to effect a liquid tight sealing of tanks T-1 and T-2.

Means are provided for puncturing the web 114 to allow passage of the liquid propellant components from tanks T-1 and T-2 to combustion chamber A upon firing of the rocket. Such means are in the form of a pair of annular knife blades 132 and 134. The blade 132, as shown is fixedly attached, by suitable means in a position spaced from the outer periphery of the larger base portion of main injector 82 such a distance as to be relatively slidable internally of end ring 130 to shear the webbing as at 136. Similarly, annular knife blade 134 is attached to wall 86 of injector 82 for sliding motion relative to the wall 126 of ring 124 to shear the webbing as at 138.

Thus, upon movement of primary piston or tank head 34, by gases released from gas tube 36, as previously described, the tank head 34, gas tube 36, the inner tank wall 81 with the attached webbing 114 and end rings 116, 124 and 130 will move rearwardly relative to knife blades 132 and 134 to shear the webbing and to allow the liquid propellants to flow to combustion chamber A where they burn to generate the propulsive gases of the rocket. This general mode of operation is characteristic of some known liquid propellant rockets and lends itself either to pressure feed of the propellants by gases generated by a solid propellant (if enough is provided) or to feeding by forces caused by acceleration. Both types of feeding mentioned are subject to the limitations and disadvantages discussed relative thereto in the earlier portions of this specification.

The instant invention and the adventages attained thereby are particularly implemented by the provision of the gas generating chamber B of the liquid propellant feeding and burning means now to be described. The wall 104 of gas generating chamber B has a rearwardly extended portion 142 for sliding movement relative to the inner annular wall of the main injector 82, its rearward movement being limited by an annular ledge and sealing ring, as shown at 140. Extension 142 is internally screw-threaded at its rearward end, as at 144, and is provided at its forward end with a series of ports 146 arranged in a plane normal to the axis of the rocket to open into liquid feeding manifold 90 at a point aft of the frangible web 114 so that after firing, i.e., after the web has been cut, liquid from inner tank T-1 can flow through the ports. A gas generator injector 148 (designated also as the secondary injector to distinguish from main injector 82) embodying a mixing gas generating or combustion chamber C is screw-threadedly attached to wall 142, at threads 144, as shown and is of a generally cylindrical external configuration. The external wall of injector 148 engages wall 142 throughout its length and, at a point rearwardly of its formost end, it is provided with a liquid feed manifold 150 having a plurality of passages 152 in communication with ports 146. Manifold 150 is in communication with injector ports 154 and 156 opening forwardly and aft respectively into combustion chambers B and C, as shown. Ports 154 and 156 each comprises an annularly arranged set of ports, as shown, of desired size and number. Thus, when liquid from tank T-1 is feeding through the main injector, a portion is diverted to combustion chambers B and C through ports 146, manifold 150 and injector ports 154 and 156 respectively. The after end of the secondary injector comprises a thickened skirt 158 extending aft to a further thickened annular nozzle 160 and extends rearwardly beyond the limiting ledge 140 and into sealing sliding relationship with the opening provided therefor in main injector 82, as illustrated. The thickened skirt 160 is provided with a plurality of liquid passages 162 opening outwardly radially as at 164 to the wall of main injector 82 with which it has sliding contact. These passages extend to the main body of secondary injector 148 to a manifold 166 from which injector ports 168 and 170 open forwardly to gas generating chamber B and aft to combustion chamber C, respectively. Manifold 166 is formed of two annular portions connected by longitudinal passages spaced between radial passages 152 of injector 148, as shown by dotted lines in FIGS. 2 and 4. Main injector 82 is provided with an annular groove 172 arranged to be covered by a portion of skirt 158 in the forward unfired position of the gas tube and secondary injector assembly, and to communicate with passages 164 in the fired position. The groove 172 has passages 173 extending radially and forwardly, opening into liquid passage 88. Thus, in the fired position, web 114 is cut and propellant liquid from tank T-2 flows through passages 88, 173, 172, 164 and 162 to manifold 166 and by way of injector ports 168 and 170 into chambers B and C respectively, to mix with liquids fed from inner tank T-1 as previously described to form a combustible mixture, generating gases as and for the purposes described.

As incidental features annular filtering screens 174 and 178 are provided for the inner tank T-1 and the outer tank T-2, respectively. The former is suitably positioned and secured in the annular notch 176, to the main injector element so that the gas tube and secondary injector assembly can slide relative thereto. Filter 178, for the tank T-2, is positioned as shown within that tank by means of a plurality of screws 180 which make threaded connection with the radial portion 120 of end ring 116, as shown. The function of such screens is, of course, to keep the injector jets clear of any solid particles which might be present by virtue of corrosive action, etc. Moreover, it has been found unnecessary to provide any means to retain magnetic balls 68 and if they should work their way to the filter screens, no appreciable liquid stoppage results. A rubber disc 182 is cemented to the forward face of secondary injector 148 to prevent blowback during firing of the initiator material. When liquids begin to flow through injector ports 156 and 170, this seal is blown off and burned.

While the general operation of the structure hereinbefore disclosed may have been adequately discussed in conjunction with the description of the various portions thereof, it is deemed advantageous to describe the entire operation at this point. Before firing, the structure is in the position shown in FIGS. 1 and 2 with an initiator P in position as described. Tanks T-1 and T-2 have been filled with the liquid propellant components, as oxidizer and fuel, by known means, not shown. Upon electrical energization of a circuit including wires 112, the dotonator 110 is activated, igniting the initiator charge P. The gases generated thereby cannot escape rearwardly because disk 106 is retained against such movement by wall 102 but can expand forwardly by displacing disk 108. Gas pressure in gas tube 36 exerts force on locking member 70 to deform the disk spring 72 around magnetic balls 68, forcing the member 70 into the pocket in the forward end of the locking assembly housing 44, thereby releasing tank head 34 and the attached parts for movement. Gas then enters gas chamber 78 through openings 76 and is effective to apply a force on the forward surface of secondary piston 42. When this force is sufficient to rupture safety disk 58 secondary piston 42 moves relative to the remaining structure, knives 52, attached thereto cutting through thin metal walls 40 before piston 42 touches primary piston 34. Upon continued motion, piston 42 contacts primary piston or tank head 34 and urges that member with its attached parts, namely gas tube 36, with the attached combustion chambers B and C (and their secondary injector), web 114, and inner tank wall 81 together with end rings 116, 124 and 130, in a rearward direction until tank head 34 contacts the stop ring 24. As a result of this movement, knives 132 and 134 cut the web 114 to allow liquids to flow from tanks T-1 and T-2 to main combustion chamber A, and by virtue of the previous cutting of the walls 40 at the forward end of the gas tube, the liquid propellants are under pressure of gas generated by the initiator for such initial flow. Also, as a result of this movement the inlet ports 164 of the secondary injector are aligned with passages 172 of primary injector 82. In this, the fired position, the liquids from tanks T-1 and T-2 have access, under pressure to all three combustion chambers. In combustion chamber A, of course, admixture and burning of the propellant liquids is for rocket propulsion and takes place in the usual manner. In combustion chamber B, as the liquids enter ports 154 and 168 from manifolds 150 and 166, respectively, gases are generated by the combustion which takes place, and sealing disk 182 is displaced and burned, disk 108 is forced through the tube 36 and the gases generated in the chamber (B) apply pressure on the liquids in the tanks, via tube 36, openings 76, and the passages cut in the primary piston wall at 40. It should be noted that the initial acceleration of the rocket, caused by the initiator, even if of only short duration, would be enough to generate forces to start feed of liquid propellant components to gas generator B, to subsequently more affirmatively pressurize the liquid propellant components. The third combustion chamber C, as previously described, burns propellant liquids to provide mixing jets of gas to cause better admixture of fuel and oxidizer in the main combustion chamber A and thus more efficient combustion.

As an incident to the mode of operation disclosed herein and as an important inventive feature, it has been found expedient to design the jets to the gas generating chamber B so that it operates fuel-rich because (1) operation well away from the stoichiometric ratio was found to give smoother burning, and (2) fuel-rich operation allows a substantial portion of gas generation to take place in the oxidizer tank by reaction of the reducing gases with oxidizer, thus allowing lower volume flow rates through the gas generator itself.

From the above it will be apparent that the present invention provides novel method and means for pressurizing the liquid propellant tanks of liquid fuel rocket propulsion systems which, by virtue of the use of liquid propellants to generate gases for this purpose results in liquid rockets which are lighter, more economical, and more advantageously designed and operated than prior known rockets of this general type.

Obviously, many modifications of the present invention are possible in the light of the above disclosure. It is therefore to be understood that the scope of the invention is to be considered as restricted only by the scope and limitations of the appended claim.

What is claimed is:

In a liquid propellant operated rocket of the type having an elongated outer cylindrical casing, an elongated tube disposed axially within said casing, a concentric wall disposed between said tube and said casing, the outer surface of said wall and the inner surface of said casing forming a first tank for a first propellant, and the inner surface of said wall and the outer surface of said tube forming a second tank for a second propellant, the two propellants being adapted, when mixed, to provide gaseous products of combustion, said tanks normally being closed at the forward and rearward ends thereof to prevent unauthorized mixture of the propellants, the improvements in combination, comprising; means operative upon firing of the rocket for communicating the forward end of said tube with the forward ends of both of said tanks and for communicating the rearward ends of both of said tanks with: a main combustion chamber disposed rearwardly of said tanks, an axially aligned first auxiliary combustion chamber disposed forwardly of said main combustion chamber, and a second axially aligned auxiliary combustion chamber disposed forwardly of said first auxiliary combustion chamber; said first auxiliary combustion chamber being so arranged that gases generated therein are jetted into the path of the liquid propellants delivered to the main combustion chamber, a burnable initiator charge disposed within said tube for initially firing the rocket adapted upon burning of same to provide gas under pressure and effect establishment of the communications aforesaid and to initially pressurize said tanks, said tube, after said initiator charge has burned, permitting communication through same between said second auxiliary combustion chamber and the forward ends of said tanks, whereby gases formed in said second auxiliary combustion chamber maintains said tanks pressurized.

References Cited in the file of this patent

UNITED STATES PATENTS

| | | |
|---|---|---|
| 2,408,111 | Truax et al. | Sept. 24, 1946 |
| 2,683,963 | Chandler | July 20, 1954 |

FOREIGN PATENTS

| | | |
|---|---|---|
| 680,718 | Great Britain | Oct. 8, 1952 |
| 702,779 | Great Britain | Jan. 20, 1954 |